United States Patent [19]

LeMay

[11] Patent Number: 5,488,510
[45] Date of Patent: Jan. 30, 1996

[54] ENHANCED DEPTH PERCEPTION VIEWING DEVICE FOR TELEVISION

[76] Inventor: Edward J. LeMay, 2219 Ludington-P.O. Box 212, Escanaba, Mich. 49829-0212

[21] Appl. No.: 280,723

[22] Filed: Jul. 26, 1994

[51] Int. Cl.$^6$ ................................................. G02B 27/22
[52] U.S. Cl. ...................... 359/478; 359/477; 351/41; 351/46; 348/44; 348/53
[58] Field of Search .................................. 359/462, 464, 359/477, 478, 567; 352/86; 351/41, 46, 47, 158; 348/42, 44, 53, 54, 832–835

[56] References Cited

U.S. PATENT DOCUMENTS

| | | | |
|---|---|---|---|
| 2,679,188 | 5/1954 | Gould | 353/10 |
| 2,943,964 | 7/1960 | Goldenberg | 428/247 |
| 4,633,322 | 12/1986 | Fourny | 348/834 |
| 4,812,031 | 3/1989 | Evans | 351/46 |
| 4,819,085 | 4/1989 | Liang | 348/819 |

FOREIGN PATENT DOCUMENTS

| | | |
|---|---|---|
| 694923 | 9/1965 | Italy . |
| 2160053 | 12/1985 | United Kingdom . |

*Primary Examiner*—Paul M. Dzierzynski
*Assistant Examiner*—Darren E. Schuberg
*Attorney, Agent, or Firm*—James M. Deimen

[57] ABSTRACT

The optical viewing device for enhanced depth perception of images on a television screen comprises a hollow body of generally rectangular shape having a rectangular opening at the front, opaque sidewalls extending to the back of the device, and an open back. The sidewalls at the back opening are generally formed to provide a substantially light tight engagement with the face of a user. The front opening of the device is covered with one or two layers of mesh screen having the warp and weft diagonal to the rectangular opening at the front of the device. The optical viewing device is sized to locate the mesh screen three and one-half to four and one-half inches from the user's eyes for viewing a television screen at least eight feet from the user.

14 Claims, 1 Drawing Sheet

ENHANCED DEPTH PERCEPTION VIEWING DEVICE FOR TELEVISION

BACKGROUND

The field of the invention pertains to devices for viewing a television screen and, in particular, for enhancing the depth perception of the viewer.

Enhanced depth perception of television scenes or "three-dimensional television" in a convenient and inexpensive form has been a long-sought goal. The approaches to enhanced depth perception have generally required a "stereo" or dual broadcast signal supplied to the television for simultaneous or alternating imaging on the screen. Separation of the stereo images has been accomplished by either relatively simple means, such as glasses with polaroid or colored lenses, or by more sophisticated means, such as liquid crystal glasses connected by wire, infrared or radio signal to the television. Viewing systems, based on the above devices, have had limited success at best in specialized applications. To date, no system or device has met with acceptance by the general public for commercial television broadcasts to the home-viewing audience.

Other systems have been proposed, such as the device disclosed in published UK patent application GB2160053A. This device consists of a pair of parallel grids, each comprising vertical bars with gaps between the bars. The vertical bars separate the right and left images shown on the television screen into images that can only be seen by the right or left eye. The device, however, requires the broadcast signal be specially processed into vertical narrow alternate strips.

A second similar device is disclosed in Italian patent 694923 wherein parallel grids comprise both vertical polarizing grids and horizontal polarizing grids mounted in a frame fastened over the television screen. The viewer wears polarizing glasses to provide the stereoscopic separation. This device requires a stereo broadcast to the television receiver and system coordination between the broadcast signal and the polarizing grids.

To avoid the expensive crystal or polarizing units or color filter glasses and laser, holographic or stereo broadcast signals required by the above approaches to enhanced depth or three dimensional television the following criteria should be met for a television optical viewing device:

(a) portable, compact, light-weight, self-contained;

(b) uses no electricity or other energy source;

(c) has no moving parts;

(d) simple and basic, both in design and concept;

(e) can be used with virtually any television receiver, whether color or black and white;

(f) no optical or other hazards to the users;

(g) enables the user to experience the increased pleasure; wonder and realism of the three dimensional effect or illusion while viewing television broadcasts, cablevision, videocassettes and laser discs.

SUMMARY OF THE INVENTION

The invention, in its basic form, comprises a viewing box or face mask device shaped to closely fit or conform to the face. The sides, top and bottom of the device are opaque to prevent unwanted light or reflections from entering the device and interfering with the light entering through the front of the device.

Adjacent the front of the device and opening is a light-gray mesh screen of one or two layers of flexible mesh screening of a mesh size typical for window and door screens. The light-gray mesh screen is positioned and arranged to form a "diamond" pattern in relation to the rectangular aperture of the front of the device. A clear glass or plastic sheet may optionally be added to cover and protect the mesh screen.

The optimal distance of the mesh screen from the viewer's eyes is about four inches to provide the depth enhancement or stereoscopic effect when viewing a television screen. There is a range of about plus or minus one-half inch from the optimum four inches within which the effect may be optimal for illusion of depth, perception fullness and spacial realism, depending on viewer preference. The television screen should be eight or more feet from the viewer. The best viewing position appears to be ten to twelve feet from the television screen, depending on the size of the television screen.

The double-diagonal or double diamond-shaped pattern created by two layers of light-gray mesh screen has been found optimal to the creation of a stereoscopic or depth enhanced view or image along with the above optimal distance from the eyes to the mesh screen.

DESCRIPTION OF THE PREFERRED EMBODIMENT

Figures 1, 2, 3:
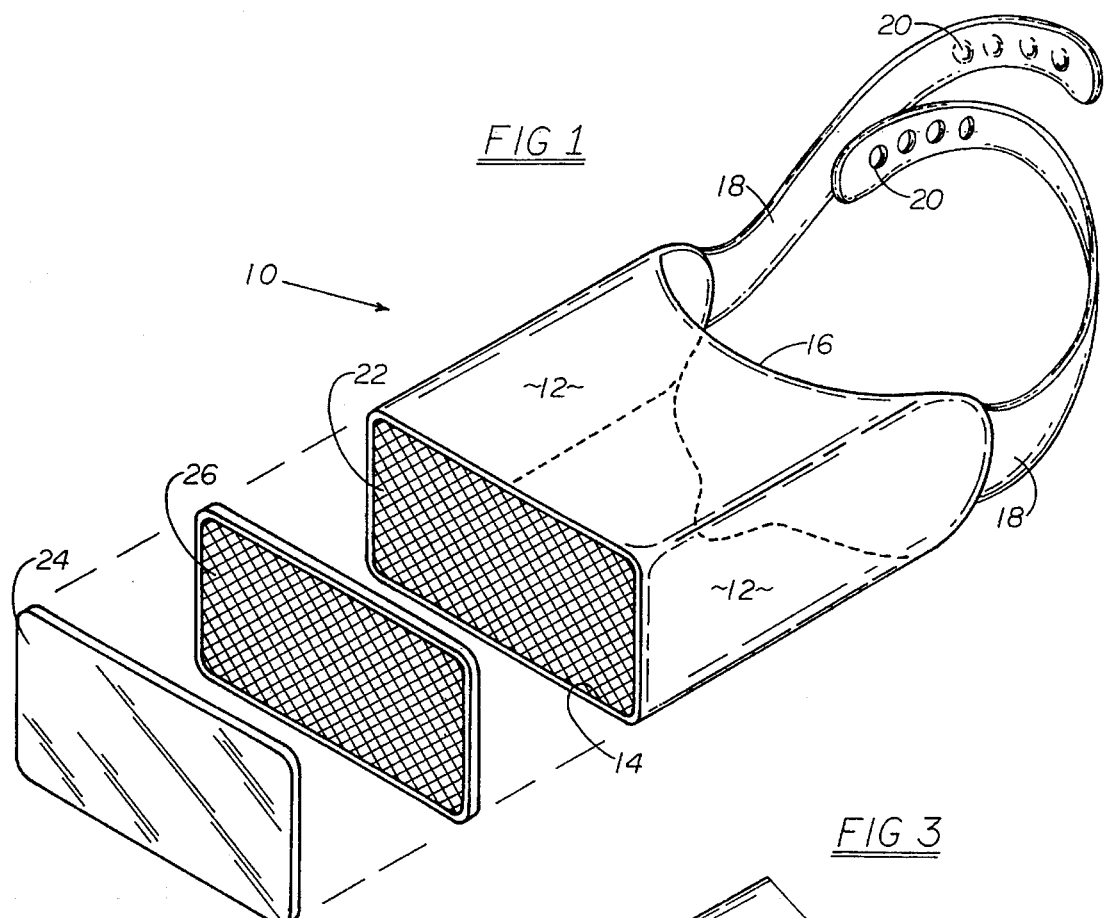
FIG. 1 is a perspective view of the optical viewing device.
FIG. 2 is a front view of the device showing the screen pattern.
FIG. 3 is an alternate construction of the viewing device.

In FIG. 1, the optical viewing device comprises a hollow body generally denoted by 10 having opaque sidewalls 12 surrounding an opening 14 at the front and open at the back 16. The periphery of the open back 16 is shaped to fit a viewer's face about the eyes with a substantially light-tight engagement. A pair of straps 18 with an attachment means 20 extend from the back 16 of the device for attachment about the viewer's head to retain the device in place for comfortable viewing. Preferably the front opening 14 is six inches by two inches and the front to back depth is about five inches.

As shown in FIGS. 1 and 2, the opening 14 at the front of the device has a screen 22 extending thereacross to cover the front. The screen 22 mesh size is substantially that of common window insect screen. Gray plastic fiberglass window screen has been found particularly suitable. The screen 22 is positioned with the warp and weft extending diagonally across the front opening 14 to create a "diamond" pattern as best shown in FIG. 2. The warp and weft may be perpendicular and therefore intercept the sides 12 above the periphery of the front opening at 45°. Or the warp and weft may be distorted to flatten the "diamond" pattern such as to 60° and 120° angles for each opening in the mesh.

A clear plastic or glass panel 24 may be fastened removably or permanently over the front opening 14 to protect the screen 22. The distance of the screen 22 from the viewer's eyes is optimally about four inches to provide the depth enhancement or stereoscopic effect when viewing a television screen. The optimal range appears to be about plus or minus one-half inches from the four inches, depending upon viewer preference for best depth enhancement.

Although a single layer of screen 22 is satisfactory, experimental testing suggests a second layer of screen 26 provides optimal enhancement of the perception of depth. The screens 22 and 26 and the clear protective panel 24 can be permanently attached to the opaque sidewalls 12 with adhesive or any other convenient means.

As an option to provide some adjustability over the three and one-half to four and one-half inch range from eyes to screen 22 the sidewalls 12 of the device may be made to telescope as shown in FIG. 3. The sidewalls 12' telescope into sidewalls 12" which, in turn, extend to the front opening 14 of the device. Dimples 28 and complementary protrusions 30 may be formed in the sidewalls 12' and 12" to provide latched positions over the one inch range of adjustment.

Tests of prototype devices have determined that the optical viewing device is effective with color or black and white, stationary or moving television screen images. The tests indicate that the illusion of depth is lost if the screen 22 is outside of the three and one-half to four and one-half inch distance from the eyes. Tests also indicate that the illusion is lost or diminished if the screen 22 warp and weft are vertical and horizontal.

The viewing device may be made with sidewalls 12 of plastic or heavy cardboard and elastic straps substituted for the snap adjustable straps 20 shown in FIG. 1. Thus, the entire viewing device may be manufactured very inexpensively as a consumer item for home use. Since no modification of the television broadcast system or television receiver is required the viewing device is equally applicable to videocassette, laser disc and cablevision.

The specific explanation for the effectiveness of the viewing device remains unknown and a variety of explanations can be advanced, however, the enhanced depth illusion is likely caused by a combination of the geometry of the device, the raster scan of the television receiver and the learned response of the human brain to the binocular vision of the eyes. The learned response of the human brain is keyed to familiar shapes, sizes, motions and relationships.

The illusion of depth as perceived by the viewer in viewing the television screen with the optical viewing device changes according to the content of the program on the screen, in particular, the amount and quality of the foreground and background material, the amount of action or movement, and the amount of actual depth in the scene represented. For example, a picture on a flat wall at one extreme or a flight over the Grand Canyon at the other extreme. Thus, the greater the contrast in depth and movement between the foreground and background of the image on the television screen, the greater will be the illusion of depth as perceived by the viewer through the new optical viewing device.

I claim:

1. An optical television viewing device comprising a hollow body having a front opening and a back opening and at least one opaque sidewall extending about the periphery of the front opening and the periphery of the back opening, the periphery of the back opening being formed for substantially light-tight engagement with the face of a user, the improvement comprising an open mesh screening across the front opening and extending to the periphery of the front opening, the warp and weave of the mesh screening extending diagonally across the front opening relative to the viewer's eyes.

2. The optical television viewing device of claim 1 wherein the distance of the front opening from the back opening is sized to position the mesh screening about four inches from a viewer's eyes.

3. The optical television viewing device of claim 1 wherein the distance of the front opening from the back opening is sized to position the mesh screening about three and one-half to four and one-half inches from a viewer's eyes.

4. The optical television viewing device of claim 1 including a clear panel affixed over the front opening and mesh screening.

5. The optical television viewing device of claim 1 including adjustable means to fasten the device to the head of a viewer.

6. The optical television viewing device of claim 1 wherein the warp and weave of the mesh screening are diagonal relative to the periphery of the front opening.

7. The optical television viewing device of claim 1 wherein the periphery of the front opening is rectangular, the longer sides of the rectangle being horizontal and the warp and weft of the mesh screening being diagonal to the horizontal and vertical sides of the rectangle.

8. The optical television viewing device of claim 1 wherein the sidewall is telescopically adjustable to position the mesh screening about three and one-half to four and one-half inches from a viewer's eyes.

9. The optical television viewing device of claim 1 wherein the mesh size of the screening is approximately that of insect screening.

10. An optical enhanced depth perception viewing device comprising a substantially rectangular hollow body having opaque sidewalls and an open back, the periphery of the open back being formed for substantially light-tight engagement with the face of a user, the improvement comprising at least one open mesh screen spaced from the open back, extending from sidewall to sidewall both horizontally and vertically and attached to the hollow body, said open mesh screen having the warp and weft extending diagonally relative to the sidewalls.

11. The optical viewing device of claim 9 including a second open mesh screen overlapping the mesh screen.

12. The optical viewing device of claim 9 including a clear panel affixed over the mesh screen.

13. The optical viewing device of claim 9 wherein the mesh size of the screen is approximately that of insect screen.

14. The optical viewing device of claim 9 wherein the mesh screen is spaced from the open back a distance sufficient to position the screen three and one-half to four and one-half inches from the viewer's eyes.

* * * * *

UNITED STATES PATENT AND TRADEMARK OFFICE
CERTIFICATE OF CORRECTION

PATENT NO. : 5,488,510

DATED : January 30, 1996

INVENTOR(S) : Edward J. LeMay

It is certified that error appears in the above-indentified patent and that said Letters Patent is hereby corrected as shown below:

Column 4, line 3, "weave" should read --weft--..

Column 4, line 23, "weave" should read --weft--.

Claims 11 thur 14 "9" should be deleted and replaced with --10--.

Signed and Sealed this

Twenty-eighth Day of May, 1996

*Attest:*

BRUCE LEHMAN

*Attesting Officer*     *Commissioner of Patents and Trademarks*